(12) United States Patent
Chen (10) Patent No.: US 9,348,086 B2
(45) Date of Patent: May 24, 2016

(54) FEW-MODE OPTICAL FIBERS

(71) Applicant: Jiangsu University, Zhenjiang, Jiangsu (CN)

(72) Inventor: Mingyang Chen, Jiangsu (CN)

(73) Assignee: JIANGSU UNIVERSITY, Zhenjiang, Jiangsu (CN)

( * ) Notice: Subject to any disclaimer, the term of this patent is extended or adjusted under 35 U.S.C. 154(b) by 0 days.

(21) Appl. No.: 14/426,725

(22) PCT Filed: Jul. 9, 2014

(86) PCT No.: PCT/CN2014/081894
§ 371 (c)(1),
(2) Date: Mar. 6, 2015

(87) PCT Pub. No.: WO2015/090049
PCT Pub. Date: Jun. 25, 2015

(65) Prior Publication Data
US 2016/0033719 A1    Feb. 4, 2016

(30) Foreign Application Priority Data
Dec. 18, 2013  (CN) .......................... 2013 1 0693100

(51) Int. Cl.
*G02B 6/036* (2006.01)
*G02B 6/02* (2006.01)
(Continued)

(52) U.S. Cl.
CPC .......... *G02B 6/02042* (2013.01); *G02B 6/3885* (2013.01); *H01S 3/06737* (2013.01)

(58) Field of Classification Search
CPC .............. G02B 6/02042; G02B 6/3885; H01S 3/06737
USPC .......................................... 385/122, 123, 126
See application file for complete search history.

(56) References Cited

U.S. PATENT DOCUMENTS 6,229,944 B1 * 5/2001 Yokokawa ........... G02B 6/4483
385/112
6,970,629 B2 * 11/2005 Lail ...................... G02B 6/4494
385/100

(Continued)

FOREIGN PATENT DOCUMENTS

CN    101852889 A    10/2010
CN    102904641 A    1/2013

*Primary Examiner* — Ellen Kim
(74) *Attorney, Agent, or Firm* — Novick, Kim & Lee, PLLC; Allen Xue (57) ABSTRACT

Herein presents a few-mode optical fiber, wherein the core comprising a main core(1) and 2N assistant cores(2), wherein N is positive integer number. All the cores are formed by the same material and embedded in a low-index background (3). The centers of the main core (1) and all the assistant cores (2) are located in a straight line. The assistant cores(2) are denoted based on the distance with the main core(1) as 1, 2, ... N. The center-to-center distance between the main core (1) and the adjacent assistant core(2) is $L_{ma}=d_m+d_{a1}$. The center-to-center distance between the assistant core(2) and the adjacent assistant core(2) is $L_{i,i}=d_{a,i}+d_{a,i+1}$ wherein i=1~N−1 and $d_{a,i}$ denotes the diameter of assistant core(2) i. That is to say, the boundary of the main core (1) is tangent to the boundary of the adjacent assistant core(2). Also the boundaries of the adjacent assistant cores(2) are tangent.

2 Claims, 5 Drawing Sheets

(51) Int. Cl.
*G02B 6/38* (2006.01)
*H01S 3/067* (2006.01)

(56) References Cited

U.S. PATENT DOCUMENTS

| | | | | |
|---|---|---|---|---|
| 7,349,607 B2* | 3/2008 | Schneider | ............ | G02B 6/4405 100/109 |
| 8,103,141 B2* | 1/2012 | Parris | ................... | G02B 6/4494 385/100 |
| 2003/0012535 A1* | 1/2003 | Town | ............... | B29D 11/00721 385/125 |
| 2005/0025441 A1* | 2/2005 | Kawanishi | ............... | G02B 6/02 385/125 |
| 2005/0069269 A1* | 3/2005 | Libori | ................ | G02B 6/02042 385/125 |
| 2005/0094952 A1 | 5/2005 | Gonthier et al. | | |
| 2013/0044988 A1 | 2/2013 | Tanigawa et al. | | |
| 2013/0044989 A1* | 2/2013 | Tanigawa | .......... | C03B 37/01222 385/126 |
| 2014/0294345 A1* | 10/2014 | Kopp | ....................... | G02B 6/30 385/24 |
| 2015/0086157 A1* | 3/2015 | Fontaine | .................. | G02B 6/14 385/28 |

* cited by examiner

FEW-MODE OPTICAL FIBERS

TECHNICAL FIELD

This invention relates to few-mode optical fibers, in particular the method to reduce the degeneracy of the modes in few-mode optical fibers.

BACKGROUND OF THE PRESENT INVENTION

Fundamental mode of a conventional optical fiber is composed of two degenerated polarized states. The high-order modes could be two or four degeneracy modes, which depends on the symmetry and degeneracy of the fiber. For example, the $LP_{11}$ mode and $LP_{21}$ mode of a step-index circular-core optical fiber are four-fold modes, whereas the $LP_{02}$ mode is two-fold mode. For the four-fold modes, each polarization state is composed of two modes, the propagation constants of which are equal whereas the mode field profiles of which are different. During the transmission, the two modes would couple owing to the variation of the refractive index of the optical fiber distribution and the environment situation, as a result, energy in the two modes would exchange.

Mode multiplexing techniques are being looked as a novel technique to improve the transmission capacity of optical fibers. Each mode in optical fibers is used as an individual channel in the mode multiplexing systems. Although multiple-input multiple-output (MIMO) can solve the mode coupling problem, this requires complex signal processing. Therefore, uncoupled transmission would be a preferred option. To realized that, each mode in the fiber should be transmitted independently, and avoid the cross-talk caused by the mode coupling. Therefore, degree of degeneracy should be reduced in high-order modes.

Two-mode optical fibers are used widespread in mode converters, mode selective coupler, acousto-optic frequency shifter, and interferometric fiber optic sensor, etc. Two-mode optical fiber refers to a kind of optical fibers that can support the propagation of two-fold $LP_{01}$ and $LP_{11}$ modes. This can be achieved by increasing the birefringence of $LP_{11}$ modes.

Degeneracy of high-order modes can be reduced by applying elliptical-core optical fiber [H. Kubota and T. Morioka. Few-mode optical fiber for mode-division multiplexing. *Opt. Fiber Technol.*, 2011, 17(5): 490-494], or photonic crystal fiber Jin, Z. Wang, and J. Ju. Two-mode photonic crystal fibers. Optics Express, 2005, 13(6): 2082-2088. . Deformation can be induced to both the high-order modes and the fundamental mode.

SUMMARY OF THE PRESENT INVENTION

This invention provides a novel kind of few-mode optical fiber.

A few-mode optical fiber composed of cladding and core, wherein the core comprising a main core and 2N assistant cores, wherein N is a positive integer number. All the cores are formed by the same material. The centers of the main core and all the assistant cores are located in a straight line. The assistant cores are denoted based on the distance with the main core as 1, 2, . . . N. The center-to-center distance between the main core and the adjacent assistant core is $L_{ma}=d_m+d_{a1}$. The center-to-center distance between the assistant core and the adjacent assistant core is $L_{i,i+1}=d_{a,i}+d_{a,i+1}$, wherein i is a number among 1 to N−1 and $d_{a,i}$ denotes the diameter of assistant core i. That is to say, the boundary of the main core is tangent to the boundary of the adjacent assistant core. Also the boundaries of the adjacent assistant cores are tangent. The cross-section of the fiber show axial symmetry and central symmetry. All the cross-sections of the fiber cores show rotational symmetry. The diameters of all the assistant cores should be smaller than that of the main core, that is, $d_{ai}<d_m$, wherein i=1~N. And the diameter of the assistant cores should meet the condition of $d_{a,i}>d_{a,i+1}$, with i=1~N−1.

According to the invention, the diameter of the main core should meet the condition of $$d_m > \frac{2.405\lambda}{\pi\sqrt{n_{core}^2 - n_{clad}^2}},$$

whereas the diameter of the assistant cores should meet the condition of $$d_{a,i} < \frac{2.405\lambda}{\pi\sqrt{n_{core}^2 - n_{clad}^2}},$$

wherein i is a positive integer in the range of 1~N, λ is the operating wavelength, and $n_{core}$ is the core index, and $n_{clad}$ is the cladding index.

The diameter of the main core should be $$\frac{1.4\lambda}{\pi\sqrt{n_{core}^2 - n_{clad}^2}} < d_m < \frac{2.405\lambda}{\pi\sqrt{n_{core}^2 - n_{clad}^2}}.$$

the diameter of the main core should meet the condition of $$\frac{1.4\lambda}{\pi\sqrt{n_{core}^2 - n_{clad}^2}} < d_m < \frac{2.405\lambda}{\pi\sqrt{n_{core}^2 - n_{clad}^2}}$$

in order to form the two-mode operation.

This invention introduces assistant cores to form the two-fold symmetry of the cross-section. The main core and the assistant cores of the invented fiber form a microstructured core. In this way, the four-fold modes in the circular-core few-mode optical fiber will split into two two-fold modes in the invented few-mode optical fiber. The mode field of one of the degenerated mode will extend to the assistant core, whereas another degenerated mode will stay in the main core. In this way, the index difference between the two modes can be increased, and the mode field coupling can be suppressed. In the mean time, the fundamental mode of the fiber can still preserve its mode field, which ensures effective splicing with the conventional optical fiber.

BRIEF DESCRIPTION OF THE DRAWINGS

FIG. 2(*a*) is the mode field profile of the $LP_{01}$ mode in an elliptical-core optical fiber;

FIG. 2(*b*) is the mode field profile of the $LP_{11}$ X mode in an elliptical-core optical fiber;

FIG. 2(*c*) is the mode field profile of the $LP_{11}$ Y mode in an elliptical-core optical fiber;

FIG. 2(d) is the mode field profile of the $LP_{21}$ X mode in an elliptical-core optical fiber;

FIG. 2(e) is the mode field profile of the $LP_{21}$ Y mode in an elliptical-core optical fiber;

DETAILED DESCRIPTION OF THE PRESENT INVENTION

Figure 1:
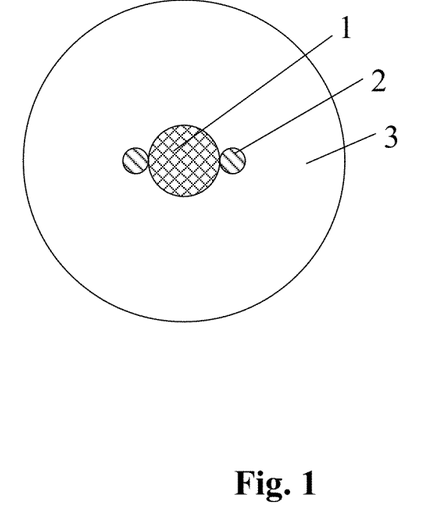
FIG. 1 is a schematic cross-sectional diagram of a few-mode optical fiber according to an embodiment of the present invention.

This invention introduces assistant cores 2 to the two-sides of the main core 1, which ensures two-fold symmetry of the refractive index distribution, as shown in FIG. 1. Therefore, the symmetry axis of the mode field of the high-order modes is fixed. Assume the main core is located at the center of the coordinate axis, and the centers of the assistant cores lie in the X axis. Then the original four-fold high-order modes in the circular-core optical fiber will split into the X and Y modes, which denotes to the mode with the symmetry axis along the X axis and Y axis, respectively.

For the Y mode, the existence of the assistant cores (2) will lead to the mode field extends to the assistant cores, which will increase its effective mode index. As for the X mode, the mode should keep the orthogonality with the Y mode, as a result, the mode field will keep away from the assistant cores. Therefore, the effective index of the X mode in the invented fiber would have little difference with the single-core optical fiber without assistant cores. Therefore, the two split modes will show increased index difference.

Figure 2:
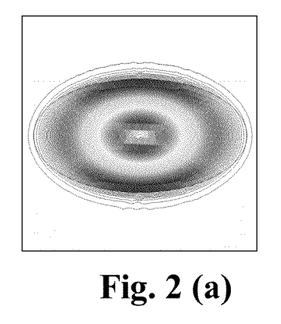

According to the mode coupling theory, coupling can happen for the modes with low index difference. Therefore, increased index difference can effectively avoid mode coupling in the few-mode optical fiber during the transmission. In addition, the mode field profiles of the high-order modes would be fixed, and makes it easy to connect with the other fibers. It can also ensure effective and selective mode coupling when it is applied to form fiber couplers. Modes in elliptical core optical fiber and high birefringent photonic crystal fibers will lead to the deformation of the all the modes. All the modes including the fundamental mode in the fibers show two-fold symmetry. FIG. 2 shows the mode distribution of the fundamental mode and high-order modes in a typical elliptical core optical fiber. The mode fields are deformed strongly in the elliptical core optical fibers.

Figure 3:
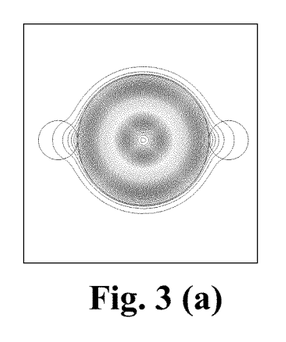
FIG. 3(a) is the mode field profile of the $LP_{01}$ mode in the fiber of FIG. 1.
FIG. 3(b) is the mode field profile of the $LP_{11}$ X mode in the fiber of FIG. 1.
FIG. 3(c) is the mode field profile of the $LP_{11}$ Y mode in the fiber of FIG. 1.
FIG. 3(d) is the mode field profile of the $LP_{21}$ X mode in the fiber of FIG. 1.
FIG. 3(e) is the mode field profile of the $LP_{21}$ Y mode in the fiber of FIG. 1.
FIG. 3(f) is the mode field profile of the $LP_{02}$ mode in the fiber of FIG. 1.
FIG. 3(g) is the mode field profile of the $LP_{31}$ X mode in the fiber of FIG. 1.
FIG. 3(h) is the mode field profile of the $LP_{31}$ Y mode in the fiber of FIG. 1.

FIG. 3 shows the mode field profile of the fiber in FIG. 1. The mode field profile of the fundamental mode in the main core shows a circular symmetric distribution, which is in contrast to elliptical core optical fibers and high-birefringent photonic crystal fibers. This is owing to the large circular main core, which preserves the circular symmetric symmetry of the fundamental mode. Owing to the large diameter of the main core, the fundamental mode would concentrate on the main core, therefore, the introduction of assistant cores have little influence on the fundamental mode. In particular, the introduced assistant cores only contact with the main core at quite small areas, which means main core is surrounded mostly by the low-index background. Therefore, the low-index background can effectively confine the fundamental mode in the main core. Only when the assistant cores are large enough or the diameter of the main core is not large enough, the mode field profile will experience strong deformation. According to the mode theory, for the fiber without the assistant cores, the $LP_{11}$, $LP_{21}$ and $LP_{31}$ modes would be four-fold degenerated modes. As shown in FIG. 3, the introduction of the assistant cores leads to the degeneracy of the modes to two two-fold modes, that is, the X and Y modes. Among which, the X modes show similar mode field profiles with the fiber without assistant cores, whereas the mode fields of the Y modes extend to the assistant cores, leading to the deformation the mode fields.

The invented fiber works different from multi-core fiber. The main core and assistant cores in the invented fiber are operated as a whole core. The modes in the invented fiber are just modification forms of the circular-core step-index fiber. That is, the assistant cores are used to adjust the mode field distribution of the guided modes.

The main core should have larger diameter than the assistant cores to ensure all the guided modes in the fiber are modified form of the modes in the step-index optical fiber composed of only the main core and the low-index background. That is, there is no additional mode exist owing to the inclusion of the assistant cores.

As a further requirement, the assistant cores should have small enough diameters to avoid the strong confinement ability. A direct determination of the diameters can be followed by the definition of normalized frequency for step-index optical fiber. The single-mode operation for the step-index optical fiber should be V<2.405, where $$V < \frac{2\pi a}{\lambda}\sqrt{n_{core}^2 - n_{clad}^2},$$

where a is the radius of the core. In this way, the diameter of the assistant cores should meet the condition of $$d_{a,i} < \frac{2.405\lambda}{\pi\sqrt{n_{core}^2 - n_{clad}^2}}.$$

Figure 4:
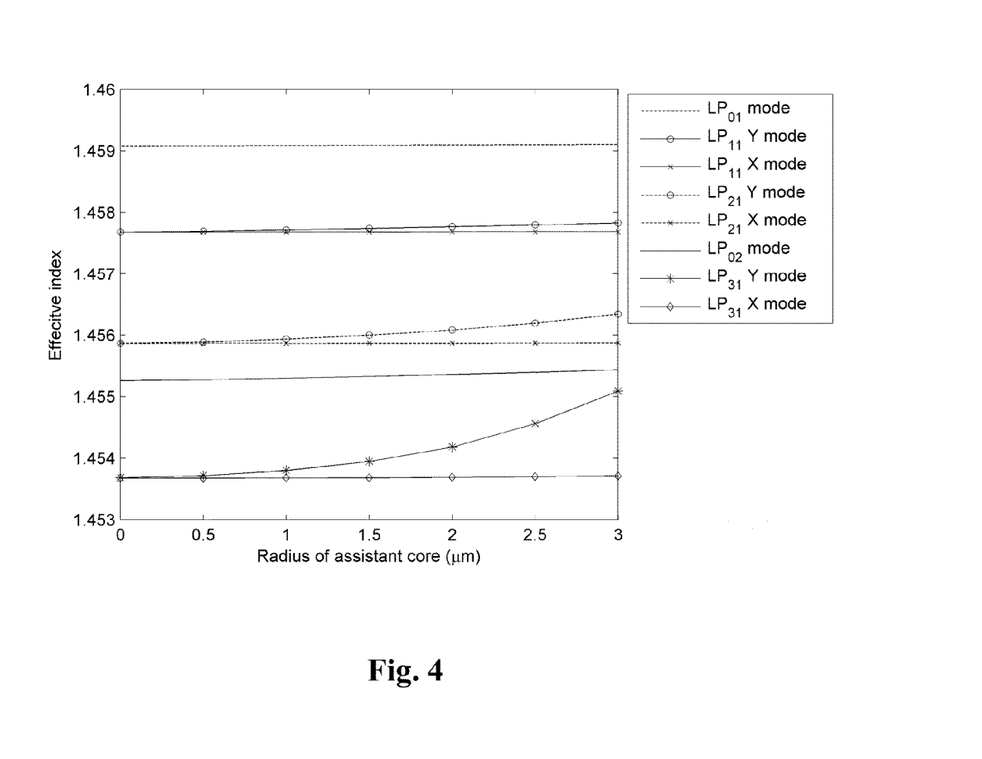
FIG. 4 shows the effective indexes of the modes in the fiber of FIG. 1 as functions of assistant-core diameter.

FIG. 4 shows the effective indexes of the fiber in FIG. 1 as functions of the diameter of assistant cores. For the degenerated modes in a circular-core fiber, the effective indexes are equal. When assistant cores are introduced, the four-fold mode will be split into two two-fold modes. For example, the effective index of the $LP_{11}$ Y mode will increase with the increase of assistant core diameters, whereas the effective index of the $LP_{11}$ X mode has little influence when the diameter of the assistant cores varies. Therefore, by choosing the appropriate assistant core sizes, all the modes in the fiber can keep a relatively large index difference between each others, in this way, mode coupling can be suppressed.

The refractive index of the assistant cores should be the same as the main core. If the refractive index of the assistant cores is lower than that of the main core, the extension of the Y mode to the assistant cores will reduce. If the refractive index of the assistant cores is higher, the mode field of each mode in the main core will extend to the assistant cores, leading to strong deformation of each mode which is not preferred. In addition, the assistant cores will be surrounded by low index materials and form individual modes in the assistant cores.

In practical application, we can use only the conventional tow-fold modes and the X modes. Such modes have mode fields similar to the modes in conventional optical fiber, can realize low loss splicing with conventional optical fibers.

Since the $LP_{11}$ X and Y modes are separated, two-mode operation can also be realized. That is, only the fundamental mode and the $LP_{11}$ Y mode will exist in the fiber, and the $LP_{11}$ X mode will be cutoff.

Two-mode operation requires that the diameter of the main core in the range of $$\frac{1.4\lambda}{\pi\sqrt{n_{core}^2 - n_{clad}^2}} < d_m < \frac{2.405\lambda}{\pi\sqrt{n_{core}^2 - n_{clad}^2}}.$$

That is, the fiber without assistant core should be single-mode guided. This is because that the introduction of assistant cores will actually increase the effective index of the modes, therefore, the assistant cores are actually used to introduce the $LP_{11}$ Y mode. As shown in FIG. 3(c), the mode field of the $LP_{11}$ Y mode will extend to the assistant cores. Therefore, the introduction of assistant cores will effectively increase the core area of the $LP_{11}$ Y mode, which makes the existence of the $LP_{11}$ Y mode possible in the invention fiber. On the other hand, the assistant cores have little influence on existence of the $LP_{11}$ X mode.

The invention can be fabricated by applying similar techniques for photonic crystal fibers. For example, the high-index rods will stack to form the cores, and the low-index rods will form the cladding, then all the rods will be filled in a silica cube to form a preform. Then the preform will be drawn to form the fiber. Owing to the lack of air holes, the fiber drawing process will be easier than the conventional photonic crystal fibers. The splicing of the fiber with conventional optical fiber will also be easy. For the two-mode operation, the size of the core could be larger, and ensures easy splicing with a conventional single-mode optical fiber and wide bandwidth over the elliptical core optical fiber.

Embodiment 1:
The cross-section of the invention fiber is shown in FIG. 1. The fiber is composed of a main core 1, two assistant cores 2 and the cladding 3. The diameter of the main core 1 is $d_m$=20 µm, the diameter of the assistant core 2 is $d_{a1}$=6 µm, the index difference between the core and the cladding is 0.01. At the wavelength of 1.55 µm, the mode field profiles are shown in FIG. 3. The effective indexes of the modes are shown in FIG. 4.

Embodiment 2:
The cross-section is shown in FIG. 1. The diameter of the main core 1 is $d_m$=10 µm, the diameter of the assistant core 2 is $d_{a1}$=4 µm, the index difference between the core and the cladding is 0.004. The fiber can keep two-mode operation at the wavelength range of 1.3~1.73 µm.

Figure 5:
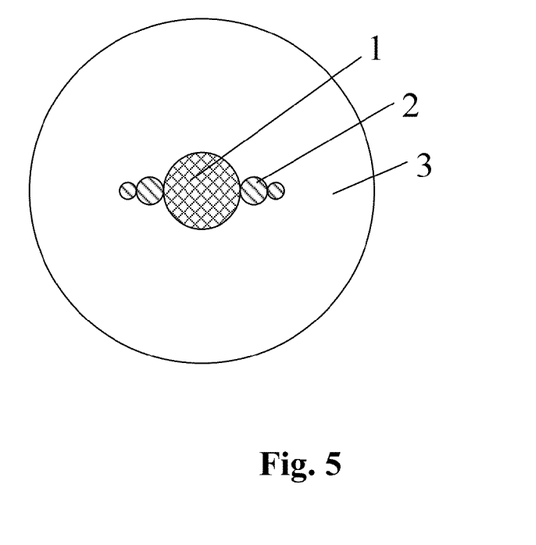
FIG. 5 is a schematic cross-sectional diagram of a few-mode optical fiber according to another embodiment of the present invention.
Figure 6:
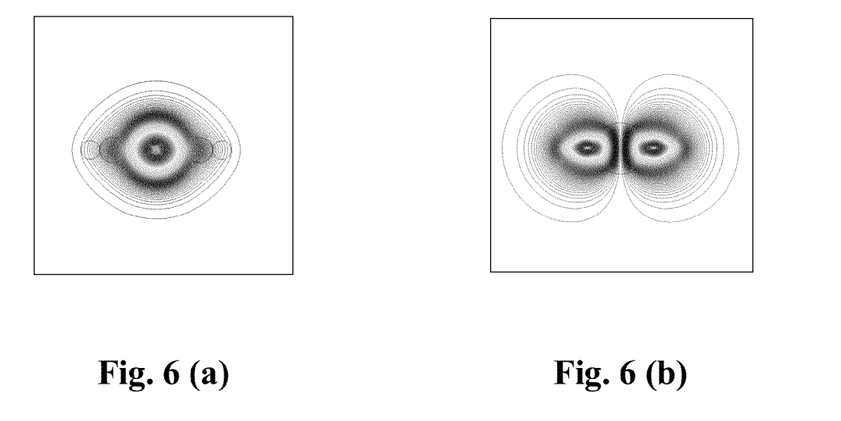
FIG. 6(a) is the mode field profile of the $LP_{01}$ mode in the fiber of FIG. 5.
FIG. 6(b) is the mode field profile of the $LP_{11}$ Y mode in the fiber of FIG. 5.

Embodiment 3:
The cross-section is shown in FIG. 5. The diameter of the main core 1 is $d_m$=10 µm, the diameter of the assistant core 2 adjacent to the main core 1 is $d_{a1}$=4 µm, the diameter of the next assistant core 2 is $d_{a2}$=3 µm, the index difference between the core and the cladding is 0.004. The fiber can keep two-mode operation at the wavelength range of 1.4~1.9 µm. The mode field profiles are shown in FIG. 6. The mode field of fundamental mode is concentrated in the main core, and the majority of the mode field of the $LP_{11}$ Y mode is in the assistant cores.

What is claimed is:

1. A few-mode optical fiber, comprising:

a main core, 2N assistant cores, N being a positive integer, and a cladding surrounding the main core and the assistant cores, wherein the main core and the assistant cores are made of a same core material, wherein any two adjacent cores are in contact with each other, wherein diameters of the assistant cores are smaller than a diameter of the main core, wherein, between two adjacent assistant cores, the diameter of the assistant core closer to the main core is larger than the diameter of the assistant core farther away from the main core, wherein the diameter of the main core is $$d_m > \frac{2.405\lambda}{\pi\sqrt{n_{core}^2 - n_{clad}^2}},$$

wherein the diameter of any one of the assistant cores is $$d_{a,i} < \frac{2.405\lambda}{\pi\sqrt{n_{core}^2 - n_{clad}^2}},$$

wherein $d_m$ represents the diameter of the main core, $d_{a,i}$ represents the diameter of one of the assistant cores, i is a positive integer in the range of 1 to N, $\lambda$ is a wavelength of an incident light, $n_{core}$ is a refractive index of the core, and $n_{clad}$ is a refractive index of the cladding.

2. A method of using a few-mode optical fiber, comprising:

selecting a few-mode optical fiber that comprises a main core, 2N assistant cores, N being a positive integer, and a cladding surrounding the main core and the assistant cores; and using the few-mode optical fiber in a two-mode operation, wherein the main core and the assistant cores are made of a same core material, wherein any two adjacent cores are in contact with each other, wherein diameters of the assistant cores are smaller than a diameter of the main core wherein, between two adjacent assistant cores, the diameter of the assistant core closer to the main core is larger than the diameter of the assistant core farther away from the main core, wherein the diameter of the main core is $$d_m > \frac{2.405\lambda}{\pi\sqrt{n_{core}^2 - n_{clad}^2}},$$

wherein the diameter of any one of the assistant cores is $$d_{a,i} < \frac{2.405\lambda}{\pi\sqrt{n_{core}^2 - n_{clad}^2}},$$

wherein the diameter of the main core $d_m$ satisfies an equation $$\frac{1.4\lambda}{\pi\sqrt{n_{core}^2 - n_{clad}^2}} < d_m < \frac{2.405\lambda}{\pi\sqrt{n_{core}^2 - n_{clad}^2}}$$

wherein $d_m$ represents the diameter of the main core, $d_{a,i}$ represents the diameter of one of the assistant cores, i is a positive integer in the range of 1 to N, and wherein $\lambda$ is a wavelength of an incident light, $n_{core}$ is a refractive index of the core material, and $n_{clad}$ is a refractive index of the cladding.

\* \* \* \* \*